Jan. 21, 1969 J. P. CHERNOCH 3,423,696
DISK LASER HAVING PUMPING MEANS IN DIRECT OPTICAL
COMMUNICATION WITH THE DISK END FACES
Original Filed Oct. 9, 1963 Sheet 1 of 2
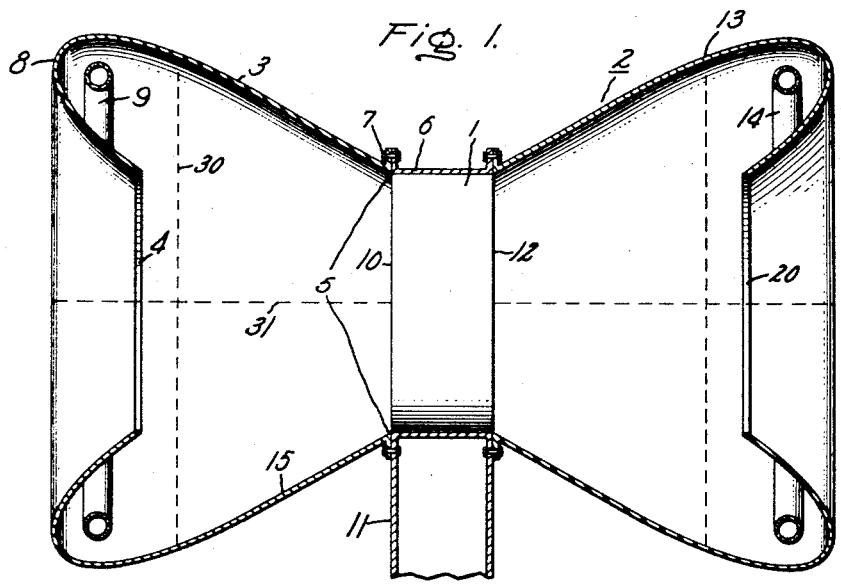
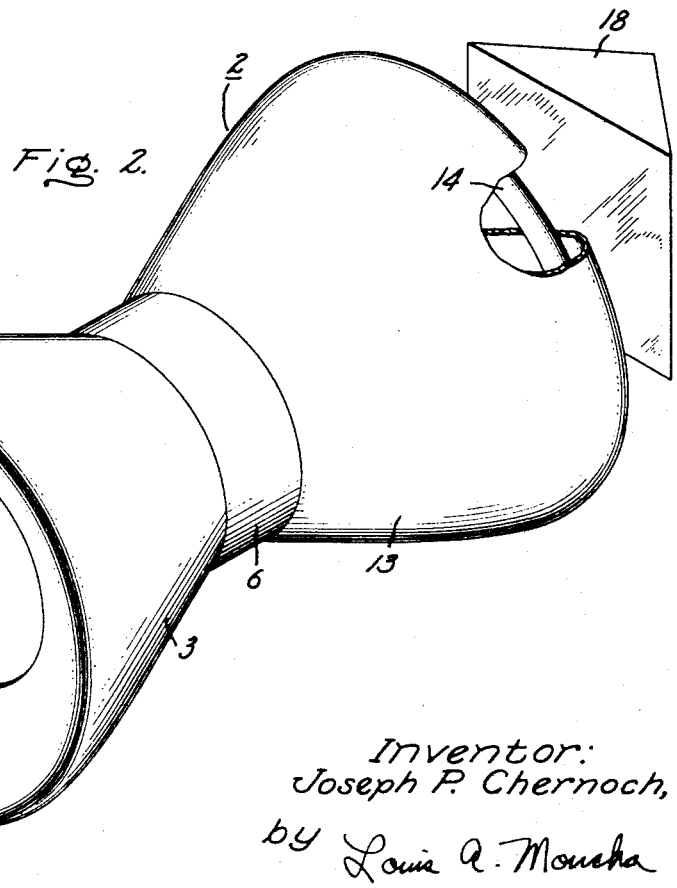
Inventor:
Joseph P. Chernoch,
by Louis A. Moucha

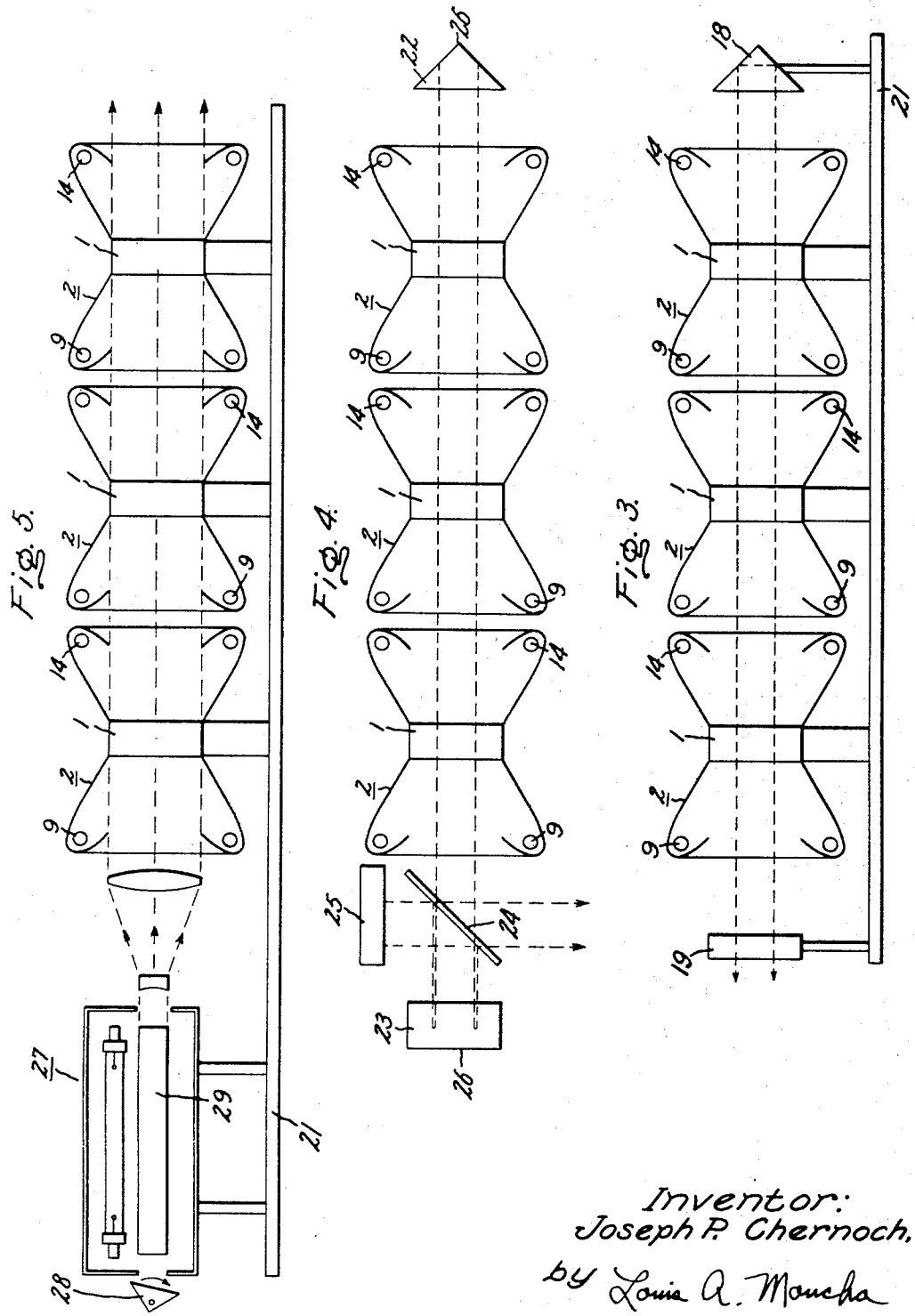

United States Patent Office 3,423,696
Patented Jan. 21, 1969

3,423,696
DISK LASER HAVING PUMPING MEANS IN DIRECT OPTICAL COMMUNICATION WITH THE DISK END FACES
Joseph P. Chernoch, Scotia, N.Y., assignor to General Electric Company, a corporation of New York
Original application Oct. 9, 1963, Ser. No. 315,054. Divided and this application Nov. 10, 1966, Ser. No. 593,414
U.S. Cl. 331—94.5   5 Claims
Int. Cl. H01s 3/02

ABSTRACT OF THE DISCLOSURE

A laser device is disclosed wherein the laser material is disk shaped, a short cylindrical solid body having large end surfaces as distinguished from the conventional long rod body. A laser beam is emitted through the end surfaces when the laser material is pumped through its end surfaces into a high energy state. The output of a pumping device is radiated directly to the laser body end surfaces since the pumping device and laser body end surfaces are in optical alignment. The large end surfaces permit generation of a high power laser beam useful especially in high power laser applications.

---

This is a division of copending application Ser. No. 315,054, filed Oct. 9, 1963.

My invention relates to a laser apparatus for generating a beam of electromagnetic energy, and in particular, to a disk-shaped laser device which is excited into a metastable high energy state by optical pumping means in direct optical communication with the end surfaces of the disk.

A recently developed device, now conventionally described as a laser (light amplification by stimulated emission of radiation), has the potential for wide application in many diverse fields such as communication, metallurgy, and medicine. The laser is a light source having the radiated output therefrom predominantly in one or more narrow bands of the electromagnetic spectrum. Such output is a narrowly diverging beam of light which is in the visible or near visible frequency range of the electromagnetic spectrum.

Although specific liquids and gases have been found to exhibit the properties of the laser, the solid laser material in rod form has provided the highest energy output, this output being generally defined in joules. The laser rod releases electromagnetic energy stored in discrete metastable states as a result of being excited by an electromagnetic signal of the correct frequency. Thus, a light source of the constant or flash-operating type may be employed to excite or optically pump a laser rod into a metastable high energy state whereupon a stimulated emission of monochromatic and directional (coherent) electromagnetic radiation is effected from the ends of the laser rod. The laser rod is preferably optically pumped along the sides thereof and the energy emitted by the laser is directly proportional to the volume of laser material. The effectiveness of the pumping is directly proportional to the surface area available for absorption of the optical pumping energy. From such consideration, it follows that the energy output of such rod is determined primarily by the geometry and size of the rod, the type of laser material, and the amount of optical pumping energy absorbed by the rod. The practical problem of producing large and long pieces of optically perfect laser material and the mechanical and thermal problems inherent in operating with such large masses of material present the disadvantage that a limit may be reached beyond which an increase in the size of the present rod-type laser is impossible.

Therefore, one of the principal objects of my invention is to develop a laser device having an improved configuration of the laser material.

The conventional rod type laser apparatus comprises a more or less cylindrical housing having a reflective inner surface and a laser rod and optical pumping lamp supported therein with the longitudinal axis of the housing, rod, and lamp being parallel. The laser rod is optically pumped both directly from the lamp and indirectly by reflection from the housing reflective surface.

Another important object of my invention is to develop a laser device having a new configuration of the laser material with respect to the housing and lamp whereby the end surface of the body of laser material is in direct optical communication with the lamp.

The conventional laser device comprises a single housing containing the aforementioned laser rod and lamp therein. Such device may be operated on a pulsed or continuous basis as determined by the optical pumping means employed. The maximum energy or power output of this device is relatively low.

A still further object of my invention is to develop a serial arrangement of laser modules wherein the outputs of the modules are additive and generate a single beam of electromagnetic energy in a continuous or pulse operating mode as determined by the optical pumping means employed. The pulsed mode provides a beam having an extremely high energy and the continuously operating mode provides a beam having a relatively high power.

Briefly stated, and in accordance with my invention in meeting the objects enumerated above, I provide a laser device comprising a housing enclosed along the length thereof and constructed of at least one curved member having a reflective inner surface and oppositely disposed first and second open ends. The laser material configuration is a relatively short cylindrical body having relatively large end surfaces, that is, of disk shape, and such laser disk is supported at the opening of the first end of the curved housing member. The second open end of the curved member is of annular configuration defining an aperture of size and shape similar to an end surface of the laser disk. At least one lamp of the flash or constant output type is supported within the annular end in encircling relationship to the aperture and in direct optical communication with an end surface of the laser disk.

Upon energization of the lamp, the laser disk is optically pumped through the end surface thereof. An optical resonant cavity is formed by positioning two reflective members, aligned with each other, external of the housing with the laser disk interposed therebetween. Since the end surfaces of the laser disk have a relatively large area, a high energy or relatively high power laser beam may be generated and emitted therefrom upon energization of the lamp.

The laser device housing may also be constructed of at least two curved members of the type hereinabove described. Such members are symmetrically arranged about the laser disk whereby the first ends thereof are adjacent each other and the annular second ends define the two ends of the housing and apertures for passage of a laser beam therethrough. Lamps are supported in both annular ends of the housing. The laser disk is supported at the first ends of the curved members. Such arrangement permits the optical pumping of both laser disk end surfaces.

The housing, laser disk, and lamps hereinabove described form what will hereinafter be referred to as a laser module. A plurality of laser modules may be mounted in a serial arrangement in an optical resonant cavity wherein the apertures are aligned with respect to each other. Simultaneous energization of the lamps contained within each module effects simultaneous optical pumping of the laser disks and thereby generates a laser beam which is emitted from an aperture end of the housing comprising the final member of the series of modules. Such laser beam may have an extremely high energy when the laser disk is operated in the pulsed mode.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein:

FIGURE 1 is a side view, partly in section, of a general embodiment of a laser module constructed in accordance with my invention;

FIGURE 2 is a perspective view, partly in section, of a specific and preferred embodiment of the laser module illustrated in FIGURE 1 and constructed in accordance with my invention;

FIGURE 3 is a diagrammatic side view of a serial arrangement of laser modules forming a first embodiment of a high energy laser oscillator;

FIGURE 4 is a diagrammatic top view of a second embodiment of a high energy laser oscillator; and FIGURE 5 is a diagrammatic side view of a third embodiment of a high energy laser oscillator.

Laser operation depends upon the fact that all atomic and molecular systems possess discrete quantum energy states; that is, they store energy in fixed amounts or quanta. These characteristic energy states are different for each element or system. The basic requirement for laser action is a material containing selected atoms whose electrons can be excited from the quantum ground state into a suitable metastable higher energy state. An electromagnetic signal of the correct frequency interacts with these atoms, that is, excites or optically pumps their electrons into such metastable higher energy state. The transition of the electrons from their lowest energy state to the metastable higher energy state is almost immediately followed by a transition back to a metastable lower energy state and then to the original stable ground energy state or terminal state. This transition to the terminal state is accompanied by what is generally described as an initial spontaneous emission of electromagnetic radiation. A suitable optical resonant cavity amplifies such initial spontaneous radiation and generates a stimulated emission of electromagnetic radiation from the laser material. This stimulated emission of radiation may be in the visible region of the electromagnetic energy spectrum or in the near visible range such as the infrared or ultraviolet. The particular emitted radiation is characteristic of the laser material being employed. The output energy of the emitted laser radiation is determined primarily by the geometry and size of the laser material and the optical pumping energy. The directionality of the emitted laser radiation is determined primarily by the geometry of the laser material and the optical resonant cavity.

The conventional geometry of laser material is a long rod generally cylindrical in shape and circular in cross section. The two ends of the rod are coated with a suitable material to form an optical resonant cavity therebetween. The optical pumping device is a helical lamp disposed about the laser rod, or in the alternative, a straight lamp positioned parallel to the rod. The lamp is of the flash type for pulsed laser operation and of the constant light output type for the continuously operating laser. The laser rod and lamp are contained within a housing also generally cylindrical in shape and having a highly reflective inner surface and a longitudinal axis parallel to the longitudinal axis of the laser rod. The lamp, upon energization, optically pumps the laser rod through the side surfaces thereof. The rod is pumped predominantly indirectly by reflection from the housing reflective surface and to a lesser degree, directly from the lamp. The output energy of the radiation emitted by the laser is determined by the energy density and area of the end faces of the laser rod. Higher outputs of laser energy are obtained by increasing the pumping energy and the length and cross-sectional area of the laser rod. However, a limit is reached beyond which an increase in the size of the present rod type laser does not generate a proportional increase in laser output energy. The limit is determined by several factors. Firstly, the activated portion of the laser material is determined by the depth to which the pumping energy can penetrate. Thus, in increasing the cross-sectional area of the laser rod beyond a particular size, the output of laser energy no longer increases as the volume of laser material but only as the diameter since the laser material within the innermost part of the rod does not become excited into the desired metastable higher energy state. Further, the laser beam generated thereby has a hollow configuration due to the unexcited part of the rod. Secondly, increasing the length of the laser rod to produce a greater surface in optical communication with the flash lamp and a larger volume of excited material and thereby generate a higher level of laser energy density, beyond a certain dimension, presents the practical problem of producing long pieces of optically perfect laser material and the mechanical and thermal problems inherent in operating with such configuration. Thirdly, destruction of the laser material occurs when the laser energy density reaches a sufficiently high level. Fourthly, a spontaneous avalanche condition occurs when the gain length factor of the laser rod exceeds a certain value thereby precluding a high degree of directivity in the beam of laser radiation. Nonuniform temperature within the laser medium during optical pumping, as a function of the laser rod radius, also causes optical path distortion. The nonuniform temperature is caused by nonuniform pump flux penetration into the laser rod.

My invention overcomes the above-mentioned problems by utilizing a novel means for optically pumping a body of laser material which has a configuration especially suitable for generating high outputs of laser energy.

Referring particularly to FIGURE 1, there is shown a side view, partly in section, of a general embodiment of a laser device constructed in accordance with my invention. The body of laser material as employed in my invention consists of a relatively short cylindrical body of laser material 1 having relatively large end surfaces or faces. I define a "relatively short" body having "relatively large" end surfaces as one in which a diameter dimension exceeds the longitudinal dimension. As herein employed "cylindrical" is defined as the surface traced by any straight line moving parallel to a fixed straight line. Thus, the cross section of the laser body may be circular, elliptical, square, or any other suitable shape as desired. The geometry is preferably such that the diameter of the laser body is considerably greater than the length thereof and thereby forms a disk-like member. Laser disk 1 is supported within a housing, designated as a whole by numeral 2, which may be made of metal. In the most general form, as illustrated in the side view of FIGURE 1, housing 2 comprises at least one hollow member 3 enclosed along the length thereof and having open ends 4 and 5 oppositely disposed from each other. Laser disk 1 may be supported within end 5 of housing member 3, but is preferably supported at such end within an enclosed bracket member 6 which may be connected to end 5 of member 3 by suitable means such as, for example, flanged parts 7 bolted together. Although end 5 is preferably of the same size as bracket 6 and is directly connected thereto, such configuration is not a requirement for the successful operation of my device. Thus, end 5 and bracket 6 may be of unequal size with end 5 being, in general, larger than bracket 6 and indirectly connected thereto; such parts may also be spaced apart in a longitudinal direction.

Part 8 of member 3 is of annular configuration in the general form of a torus and defines an aperture (open end 4) of size and shape conforming to the size and shape of laser disk 1. For practical purposes, the size of aperture 4 is slightly greater than laser disk 1. The particular geometry of housing member 3 is determined primarily by the geometry of laser disk 1 and the optical pumping means therefor as hereinafter described.

An optical pumping means for the laser disk is supported within annular part 8 of member 3. The optical pumping means comprises at least one lamp of a type having a radiation output preferably in a narrow and desired spectral range to concentrate such lamp radiation in the particular spectral area required to optically pump the laser material. Such lamp may be of the constant or flash-operating type to obtain respectively a continuous or pulse mode of laser operation. The particular shape of lamp 9 in outline is determined primarily by the geometry of laser disk 1. In the most general case, the outline of lamp 9 and the cross section of the inner surface of member 3 in a plane perpendicular to the longitudinal axis of the laser disk 1 may be different from the outline of the laser disk. However, the preferable shape of the lamp and cross section of the inner surface of member 3 conforms to the shape of laser disk 1. Such combination of similar shapes provides maximum efficiency of transfer of optical pumping energy to the near surface 10 of the laser disk and uniform irradiation of surface 10 over its area. Thus, a laser disk square or elliptical in outline (cross section) is preferably utilized with a housing having member 3 being respectively square or elliptical in cross section, and a lamp 9 of the same respective outline. It is to be understood that the word "lamp" as used herein may comprise a single lamp or a plurality of lamps disposed in a particular planar arrangement to form the equivalent of a single long lamp. Thus, in the square or elliptical laser disk configuration, described above, lamp 9 preferably has a square or elliptical shape respectively, or alternatively, lamp 9 comprises four straight lamps arranged to form a square outline or a plurality of straight or curved lamps forming an ellipse. Housing member 3 may be formed of two parts connected together (shown as dashed line 30, or alternatively, dashed line 31) for ease of insertion and removal of lamp 9. The inner surface of housing member 3 is highly reflective to increase the efficiency of the laser pumping. The laser device hereinabove described is rigidly supported on a base member 21 (not shown in FIGURE 1 but illustrated in FIGURES 3 and 5) by means of support member 11 which is preferably connected to housing member 6 in any suitable manner, but may also be connected to housing member 3.

The laser device as hitherto described comprises a single face pumped laser device. For particular applications, such device is preferred and external reflectors 18, 19 (not shown in FIGURE 1 but illustrated in FIGURE 2) are positioned at the two ends of the housing as defined by aperture 4 and end surface 12 of the laser disk to define an optical resonant cavity. However, it is more frequently desired to optically pump both end surfaces of the laser disk. In such case, an additional housing member 13 is provided adjacent the second end face 12 of laser disk 1. Housing member 13 is, in general, of identical shape as housing member 3 and a lamp 14 is supported therein in the same manner as lamp 9 in housing member 3. Thus, the configuration of a laser device having double end face pumping comprises an arrangement of housing members having reflective inner surfaces and optical pumping means symmetrically disposed about a plane passing parallel to the end faces of the laser disk and centrally thereof. The radiation (laser pumping energy) emitted by the lamps is directed at the end faces of the laser disk, both directly and indirectly by reflection from the inner surface of housing members 3 and 13.

FIGURE 2 illustrates a perspective view of a preferred embodiment of my laser device. FIGURE 2 represents a specific example of the general embodiment illustrated in FIGURE 1. In FIGURE 2 the body of laser material is circular in cross section and lamp 9 (and lamp 14 for double end face pumping) is also circular in shape. In the alternative, a plurality of curved lamps are supported within annular part 8 in encircling relationship to aperture 4 in the single end face pumping case. For purposes of illustration, housing members 3 and 13 are illustrated as comprising single members, however, as above described, each member may comprise two (or more) parts as necessitated for the insertion and removal of the lamps from the interior of the annular parts.

The particular shape of the inner surface of the hollow housing members 3 and 13 is adapted to provide: high efficiency of transmission of the pumping radiation from the lamps to the end faces of the disk, irradiation uniformly across such end faces, and ease of fabricating the housing members. A preferred embodiment of the inner surface of housing member 3 (and 13) which is a compromise between maximum and uniform optical coupling between the combination of the lamp and housing reflective surface and the end face of laser disk 1 comprises the following configuration: annular part 8 is an elliptical torus and part 15 is frusto-conical in shape. Thus, each member 3, 6, and 13 of housing 2 comprises curved members with the inner surfaces of members 3 and 13 being highly reflective. Alternatively, annular part 8 may be a compound elliptical torus, a parabolic torus, or even a circular torus and part 15 may be a surface generated by a curved line rotated about the longitudinal axis of the laser disk as distinguished from the frusto-conical section generated by a straight line rotating about such axis. Lamps 9 and 14 are supported within the annular parts of housing 2 by having their terminal ends 16 suitably supported, electrically insulated, and brought out through housing 2. A suitable source of electrical energy 17 is connected to the terminal ends of the lamps. In the case of flash lamps, a conventional high voltage electronic trigger circuit (not shown) may be employed to initiate the gaseous discharge within such flash lamps. Since the lamp portion 8 of the housing develops an electro-magnetic radiation of relatively high intensity, a suitable selective radiation filter 32 may be provided for isolating the lamp from the laser disk to filter out the spectrum of the lamp radiation which is not useful for pumping the laser disk and thereby reduces the heating of the laser disk. Alternatively, or in addition, cooling means such as forced air or liquid coolants may be employed. The cooling means is most effective when applied to the lamps and may comprise suitable water jackets. A controlled atmosphere may also be provided within housing 2 to minimize absorption by such atmosphere of the intense pump and the laser output radiation. Such atmosphere may be provided solely in the disk portion of housing 2 or may completely fill the housing. This atmosphere should be a homogeneous media, i.e., provide a constant index of refraction. The atmosphere may be of any of a number of suitable gases such as nitrogen. A vacuum may also be employed in the disk portion of the housing, in which case, cooling means should be provided in the lamp portion of the housing.

Lamp 9 (and 14) is in direct optical communication (line-of-sight) with an end face 10 (and 12) of the laser disk, and such lamp in combination with the reflective inner surface of housing 3 provides an intense light source. Such intense light source optically pumps the laser disk through the end face thereof into a metastable high energy state characteristic of the laser material employed. The laser disk contained within an optical resonant cavity thence releases such high energy in the form of a narrowly diverging beam of electromagnetic radiation emitted from the end faces and directed along the longitudinal axis of the laser disk.

The combination of the laser disk, lamps, and housing hereinabove described forms what may be defined as a laser module. A specific example of a laser module comprises the following elements. Laser disk 1 comprises neodymium glass measuring six inches in diameter by two inches in thickness. The composition of such laser material comprises a 1 percent neodymium doped lanthanum borate glass. The end faces of the laser disk are flat, polished, and coated with a low reflection coating for the particular laser wavelength while the cylindrical side surfaces are left unpolished. The end faces are not necessarily optically flat, the criterion being that the optical transmission through the laser material is uniform. A circular xenon flash lamp 9 (and 14) is employed when generating a pulsed laser beam. A circular arc lamp is employed for laser operation on a continuous output basis. The lamp is supported within an annular portion 8 of housing member 3 (and 13) having an elliptical torus configuration. The inner surface of housing member 3 (and 13) is polished aluminum. External reflectors 18 and 19 define an optical resonant cavity and are the only elements requiring critical alignment. The interposed laser disk being a flat plate cannot distort the plane standing-wave pattern in the cavity if misaligned. Thus, the laser disk need not be aligned with respect to the cavity, and in some applications, may be deliberately nonaligned. The external reflectors shown in FIGURE 2 consist of a totally reflective prism 18, such as a conventionally known 90 degree roof or Porro prism at one end and a partially transmitting dielectric plane mirror 19 at the other end. In this arrangement, the Porro prism 18 directs the collimated laser beam toward the plane mirror end and the laser beam passes from the latter end outwardly as indicated by the arrows. The laser beam generated by the neodymium laser disk and emitted through apertures 4 and 20 is a highly collimated and coherent electromagnetic radiation having a wavelength of 1.06 microns which is in the visible infrared spectrum.

The large area of the end faces provided by the disk-shaped laser, in addition to providing an efficient pumping geometry, permits the generation of a high output of laser energy while maintaining the energy or power density within the laser material below the destructive level. The laser modules hereinabove described can be combined into system components such as a high energy laser oscillator or power amplifier.

FIGURE 3 illustrates a first embodiment of a high energy laser oscillator comprising a plurality of laser modules wherein each module is optically coupled with the adjoining modules. Thus, the modules are rigidly supported on a base member 21, conventionally known as an optical bench, and apertures 4 and 20 of each module are aligned with respect to each other whereby laser disks 1 are also in alignment. The modules are spaced apart sufficiently to minimize the spontaneous avalanche effects which are inherent in the long rod-type lasers. A high energy oscillator configuration is obtained by arranging the laser modules in series with external optical reflectors at either end. The external reflectors define an optical resonant cavity and are the only elements requiring critical alignment, as heretofore described. The external reflectors 18, 19 in FIGURE 3 are of the same type as illustrated in FIGURE 2.

At high pumping levels and without additional spatial mode selecting devices, the assembly illustrated in FIGURE 3 may sustain a number of off-axis divergent modes. The off-axis modes can be minimized by widely spacing the cavity reflectors 18, 19. A second high energy oscillator configuration illustrated in top view in FIGURE 4 offers a higher degree of spatial mode selection than that of FIGURE 3. In the FIGURE 4 embodiment, the laser cavity is formed by crossed Porro prisms 22 and 23, that is, two 90 degree roof prisms which have been rotated about the laser disk longitudinal axis at an angle of 90 degrees with respect to each other. The laser energy is extracted from the laser cavity by means of a partially reflective mirror 24 which is angularly disposed with respect to the laser disk axis. Mirror 24, conventionally described as a beam splitter, is positioned between one of the end laser modules and the adjacent roof prism. Such arrangement permits the laser beam to be emitted in two directions angularly disposed with respect to the laser disk axis. A third roof prism 25 may be employed to direct the laser beam in only one of such two directions as indicated by the arrows. The improvement in mode selection, that is, beam collimation, is achieved by rotating roof prisms 22, 23 about the axis defined by the roof edge 26. The angle of rotation is adjusted so that the on-axis mode falls within the critical angle of the total internal reflective surfaces formed by the prism. The off-axis modes which cause the beam divergence thus fall outside the critical angle and instead of being reflected pass directly through the prism. A high degree of spatial mode selectivity is achieved and a laser beam divergence of less than one minute of arc is maintained. The crossed Porro cavity has a further advantage in that the cavity is self-aligning and does not require critical alignment of the Porro prisms. Also, this cavity being formed by total internal reflecting surfaces sustains a higher laser radiation density than conventional multi-layer dielectric mirrors.

A third embodiment of a high energy laser oscillator utilizes a plurality of laser modules whose sole function is that of power amplification. FIGURE 5 illustrates this arrangement wherein the laser modules are not contained within what has been hereinabove described as an optical resonant or laser cavity, that is, the modules are not enclosed by external reflectors at either end. In FIGURE 5, the laser modules are used to amplify the output of a relatively low output energy laser oscillator 27, which may comprise any well-known configuration such as the Q-switch type wherein a rotatable prism 28 is aligned with one end of a laser rod 29 and is rotated to produce intervals of reflection and nonreflection of the laser beam being generated by the laser rod. Low energy laser oscillator 27 provides a beam of minimum divergence since the relatively low output permits use of spatial mode selecting components, such as a limiting aperture positioned at the common focal point of two spaced-apart positive lenses, that would not be suitable for use at high energy levels. The divergence of the laser beam is further reduced by magnifying the beam and thereby completely filling the end faces of the laser disks in each of the amplifier modules. Beam divergence of the order of seconds of arc is attained with this configuration. The efficiency of the oscillator power amplifier configuration shown in FIGURE 5 may be improved by several means. Thus, to fully extract the energy stored in the laser disks, the disk amplifiers should be driven to saturation. This can be accomplished by increasing the number of modules in series whereby the modules at the beam-emitting end are driven to saturation, or by providing an optical regenerative feedback system which is isolated from the low energy laser oscillator.

From the foregoing description, it can be appreciated that my invention makes available a new laser apparatus which employs a relatively short cylindrical body of laser material having relatively large end faces, and such end faces are optically pumped by lamps in direct optical communication therewith. Essentially uniform pump flux across the end faces and high optical coupling efficiency are obtained with this arrangement. The disk laser permits generation of a high energy beam of electromagnetic radiation, especially when operable in the pulsed mode. A laser module comprising a laser disk two inches thick and six inches in diameter is capable of emitting a laser beam having an energy output of 1,000 joules. This energy level is substantially increased by forming a serial arrangement of optically coupled laser modules. Thus, a series of ten such modules provides a beam having an energy of 10,000 joules. Since the energy output of a laser device is directly proportional to the volume of laser material, and a disk-shaped laser having an end face diameter of several feet may readily be manufactured, it is apparent that a much greater volume of laser material may be optically pumped and thereby provide an extremely high level of laser energy in the form of a narrowly diverging beam of electromagnetic radiation. The laser disk is thus not volume limited as in the case of the long rod-type laser. Further, the laser disk geometry relaxes the requirements on laser material homogeneity in that local variations in refractive index can be compensated by further polishing of the deformed surface. Finally, temperature distribution and density of the metastable states are considerably more uniform as a function of radius in the disk-type laser device as compared to the rod-type laser. Variations in both temperature distribution and density of the metastable states do vary in the longitudinal direction for the disk laser but such variations do not degrade the optical phase front along the diameter of the disk.

Having described a preferred embodiment of a new laser module, and three serial arrangements thereof, it is believed obvious that modifications and variations of my invention are possible in the light of the above teachings. Thus, the reflective inner surface of the housing may comprise a plurality of small flat mirrors in place of the continuous surfaces hereinabove described. Such arrangement provides controllable focusing of the lamps' radiation upon the end faces of the laser disk. One or both end faces of the laser disk may be optically pumped as desired. The optical pumping energy may be increased by arranging a plurality of lamps in parallel within annular part 8. Also, cooling means for the lamps, controlled atmospheres, and selective filters isolating the disk from the lamps may be employed singly or in combination. For continuous laser operation, cooling of both the disk and lamps is necessary. The laser beam divergence can be further controlled by interposing optical mode selectors between the laser modules. Also, an increasingly greater number of laser modules may be serially arranged in optical communication to increase the level of generated laser energy to a point ust before damage to the laser disks may occur. Finally, my invention is not limited to neodymium as the laser material, but is intended to include other solid laser materials such as the well-known ruby, for example. It is, therefore, to be understood that changes may be made in the particular embodiment of my invention described which are within the full intended scope of the invention as defined by the following claims.

What I claim as new and desire to secure by Letters Patent of the United States is:

1. In a laser module adapted for having the pumping of the laser material and resultant laser beam emission therefrom effected through an end surface of the laser material and comprising
    a housing having at least one end thereof comprising an annular configuration having a reflective inner surface, said annular configuration defining an aperture end of said housing,
    a relatively short cylindrical body of material capable of exciting into a metastable high energy state and stimulated emission of electromagnetic radiation therefrom and having relatively large end faces, said body of material being supported within said housing, and
    at least one curved lamp supported within said annular configuration in direct optical communication with an end face of said body of material whereby said body of material is optically pumped into the metastable high energy state solely through the end face thereof upon energization of said lamp, and a resultant emission of a beam of electromagnetic radiation from the body of material is effected through at least one of said faces.

2. In a laser module adapted for having the pumping of the laser material and resultant laser beam emission therefrom effected through an end surface of the laser material and comprising
    a hollow housing enclosed along a longitudinal axis thereof and comprising at least one curved member terminating in a first end having an annular configuration and a reflective inner surface,
    a relatively short cylindrical body of material capable of excitation into a metastable high energy state and stimulated emission of electromagnetic radiation therefrom and having relatively large end faces, said body of material being supported at a second end of said curved member, said member first and second ends defining apertures of size at least as large as the end face of said body of material and of shape similar thereto, and
    at least one curved lamp supported within the annular first end of said member, said lamp disposed in a plane substantially parallel to an end face of said body of material and in direct optical communication therewith whereby said body of material is optically pumped into the metastable high energy state solely through the end face thereof upon energization of said lamp, and a resultant emission of a beam of electromagnetic radiation from the body of material is effected through at least one of said end faces.

3. In a laser module adapted for having the pumping of the laser material and resultant laser beam emission therefrom effected through an end surface of the laser material and comprising
    a hollow housing enclosed along a longitudinal axis thereof and comprising at least two curved members, two of said curved members each having a reflective inner surface and terminating at first ends thereof in annular configurations, said annular first ends defining the two ends of said housing, said two members each terminating at a second end thereof oppositely disposed from the respective said first end,
    a relatively short cylindrical body of material capable of excitation into a metastable high energy state and stimulated emission of electromagnetic radiation therefrom and having relatively large end surfaces, said body of material being supported within said housing at said second ends of said two curved members, said annular first ends defining apertures for the passage of a beam of electromagnetic radiation therethrough, and
    at least one curved lamp supported within each of the two annular housing ends, said lamps disposed in two planes substantially parallel to the end surfaces of said body of material and in direct optical communication therewith whereby said body of material is optically pumped into the metastable high energy state through the end surfaces thereof upon energization of said lamps, and a resultant emission of a beam of electromagnetic radiation from the body of material is effected through at least one of said end surfaces.

4. In a laser apparatus adapted for having the pumping of the laser material and resultant laser beam emission therefrom effected through an end surface of the laser material and comprising
    a plurality of serially coupled laser modules, each laser module comprising
        a housing having a reflective inner surface,
        a relatively short cylindrical body of material capable of excitation into a metastable high energy state and stimulated emission of electromagnetic radiation therefrom and having relatively large end faces, said body of material supported within said housing, and
        means in direct optical communication with at least one end face of said body of material for optically pumping the material into the metastable high energy state solely through the end faces of said body of material, said housing having apertures aligned with the end faces of the body of material contained therein, and a resultant emission of a beam of electromagnetic radiation from the body of material is effected through at least one of said end faces, and means for supporting the plurality of housings in aperture alignment with each.

5. A laser apparatus comprising a plurality of serially coupled laser modules, each laser module comprising a housing comprising at least one curved member having a reflective inner surface and terminating in a first end having an annular configuration, a relatively short cylindrical body of material capable of excitation into a metastable high energy state and stimulated emission of electromagnetic radiation therefrom and having relatively large end faces, said body of material being supported within said housing at a second end of the curved member, at least one curved lamp supported within said annular first end, said lamp being in direct optical communication with an end face of said body of material whereby said body is optically pumped into the metastable high energy state solely through the face thereof upon energization of said lamp, said housing having at least one aperture defined by said annular first end wherein said aperture is aligned with the end faces of said body of material, optical resonant cavity means positioned external to the plurality of laser modules and including said bodies of material whereby a beam of electromagnetic radiation is generated and emitted from said bodies of material through said end faces thereof and through the apertures upon the bodies of material being optically pumped into the metastable high energy state, the beam being emitted from said optical resonant cavity means through a partially transmissive end thereof, and means for supporting the plurality of housings in aperture alignment with each other whereby the beam of radiation generated by each laser module is amplified to a higher output energy upon passage through a subsequent laser module and ultimate passage out of the laser apparatus through the transmissive end of said optical resonant cavity means.

References Cited

UNITED STATES PATENTS 3,241,085  3/1966  Marcatili _____ 331—94.5
3,292,102  12/1966  Byrne _____ 331—94.5

OTHER REFERENCES

Chinoda et al: Light Source System for Ruby Laser, Japanese Journal of Applied Physics No. 6, vol. 1 (December 1962) pp. 364 and 365.

JEWELL H. PEDERSEN, *Primary Examiner.*

W. L. SIKES, *Assistant Examiner.*